March 9, 1965     O. W. BURKE, JR., ETAL     3,172,726
CYCLIC PROCESS FOR PRODUCING SILICA PIGMENT
Filed Oct. 3, 1961
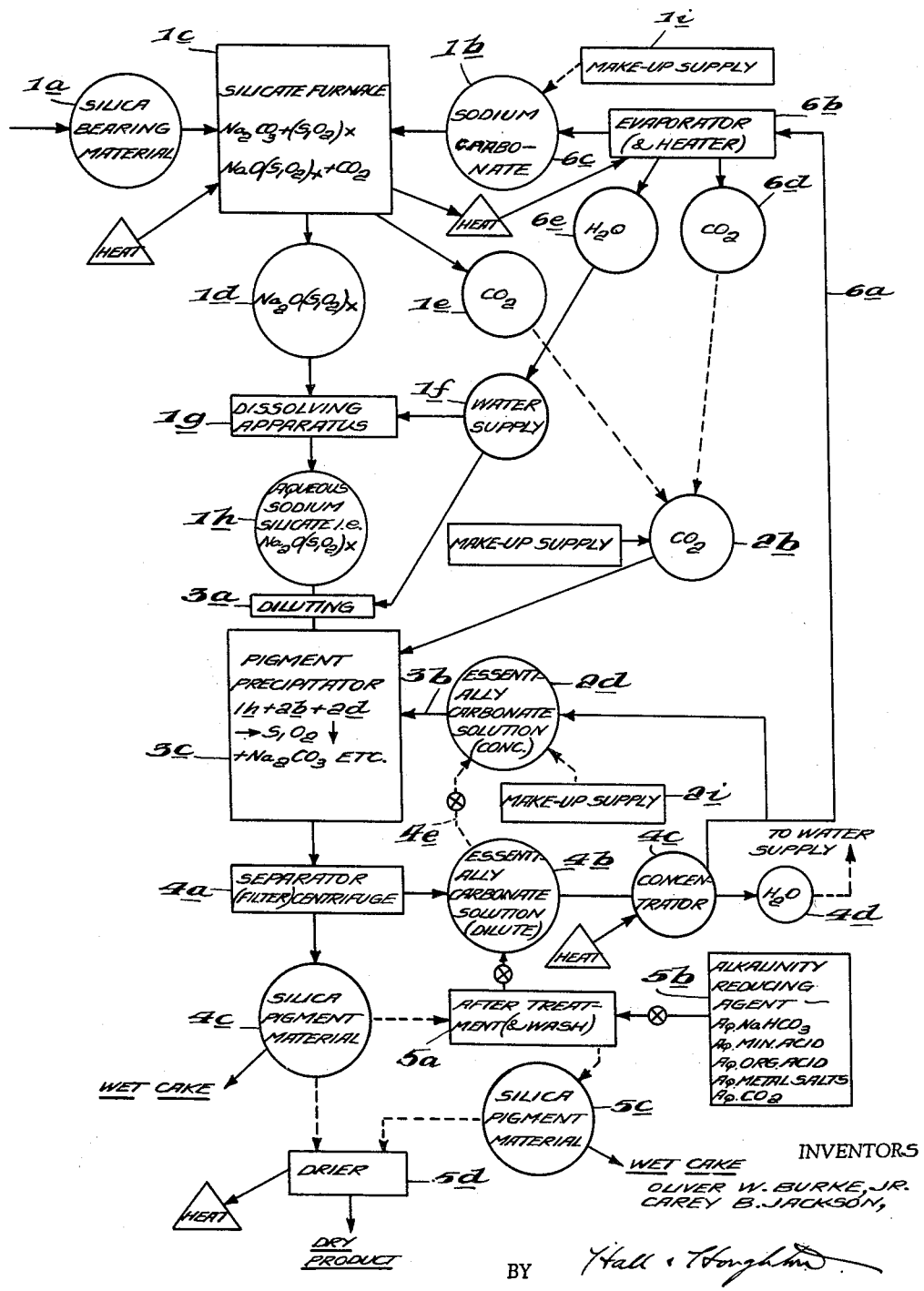
INVENTORS
OLIVER W. BURKE, JR.
CAREY B. JACKSON,
BY
ATTORNEY

United States Patent Office 3,172,726
Patented Mar. 9, 1965

3,172,726
CYCLIC PROCESS FOR PRODUCING SILICA PIGMENT
Oliver W. Burke, Jr., 506 Intracoastal Drive, Fort Lauderdale, Fla., and Carey B. Jackson, Pompano Beach, Fla.; said Jackson assignor to said Burke
Filed Oct. 3, 1961, Ser. No. 142,662
6 Claims. (Cl. 23—182)

This invention relates to silica pigment materials and to the preparation thereof from silica-bearing materials, such as silica flour, quartz and sand, and aims generally to improve the same.

Particular objects of the present invention, severally and interdependently, are to provide an improved process for the preparation of silica pigment including but not limited to, silica pigment of reduced alkalinity; to provide a process which in operation requires as raw material essentially only the pigment producing materials; and to provide an improved silica pigment having useful characteristics and at an economical cost.

Other objects and advantages of the invention will be apparent from a consideration of the following general and specific description of illustrative embodiments thereof.

In general, in accordance with the present invention the improved pigment is produced by a new process consisting of four integrated steps, (1) forming sodium silicate by reacting sodium carbonate and silica, (2) forming silica pigment by reacting sodium silicate solution with carbon dioxide in the presence of sodium carbonate solution, and (3) effecting economy and purification by recycling of by-products within the system.

In a preferred embodiment, in step (1) sand or other source of relatively pure silica is reacted with sodium carbonate and converted to carbon dioxide and sodium silicate and the latter is dissolved in water; in step (2) carbon dioxide, which may be derived from step (1), is reacted with aqueous solution of sodium silicate from step (1) in the presence of preformed sodium carbonate solution to produce a precipitate of silica pigment material which is separated from the aqueous sodium cabonate, the latter being concentrated and recycled to steps (1) and (2) of the process in step (3).

In its preferred embodiments, this process for converting silicia to silica pigment requires only an initial charge of sodium carbonate with subsequent make-up thereof to provide for processing losses. Process efficiency is thus accomplished in the present process. In the instant case, moreover, the recycling does not result in collection of impurities in the system. To the contrary, since the silica pigment material is finely divided and highly absorbent it tends to sequester and remove any impurities finding their way into the system so that the recycled materials tend to become more and more nearly pure as recycling continues. For this reason, as the recycled materials become purified, the purity of the silica pigment product being obtained ultimately is limited only by the nature and purity of the silica-bearing and make-up materials fed to the system. This fact simplifies the problem of quality control.

Where sodium carbonate solution is being transferred from step (3) to step (1) and to step (2) it may contain some sodium bicarbonate, which is not detrimental to the process.

General and particular aspects of the process according to the present invention will best be understood by reference to the following detailed specification of preferred embodiments of the invention, taken in connection with the accompanying drawing forming a part thereof, wherein:

FIG. 1 is a flow sheet illustrating the sequence of steps and flow of materials in a preferred embodiment of process according to the invention.

In such preferred embodiment, in step (1) the silica-bearing material such as silica flour, silica sand, or the like (as indicated at 1a in the drawing), together with sodium carbonate (1b), is fed to a reactor such as a silicate furnace (1c) wherein sodium silicate (1d) is formed by reacting at elevated temperature the silica bearing material (1a) and the sodium carbonate (1b) with the elimination of carbon dioxide (1e). There is thus formed a water soluble sodium silicate glass consisting of an intimate combination of from 1 to 4 moles of silica per mole of sodium oxide. Preferably, in the present process the ratio of $SiO_2$ to $Na_2O$ is kept near the upper end of this range, a ratio of 3 to 3.9 moles of $SiO_2$ per mole of $Na_2O$ being preferred. The silicate furnace may be an open hearth furnace of the regenerative or recuperative type, which for the purposes of this invention may be adapted for the recovery of the carbon dioxide gas therefrom (as indicated at 1e). A preliminary heating at above 700° C. may be employed, and allows most of the carbon dioxide to be removed, and the reaction (in 1c) is preferably completed in the range of 1200-1400° C. Where the sodium carbonate (1b) is being prepared by evaporation of a solution as in step (6) hereinafter described, the hot gases from step (1) may be employed for effecting such heating.

The product of step (1) is then dissolved in sufficient water, in one or more steps (1g and 3a) to form a relatively dilute solution having a solids content of $Na_2O$ $(SiO_2)_x$, in the range of 5% to 20% preferably 8% to 12% (this concentration being further reduced by the addition of sodium carbonate solution (2d) thereto). In the initial dissolving step (1g) a solids content is preferably produced of about 35% to 40% by weight, and the sodium silicate may conveniently be passed to intermediate storage (1h) at this concentration.

The solution (1h) appropriately diluted (at 3a) is conveyed a pigment precipitator (3c) where it is acidulated with carbon dioxide (2b) bubbled into the solution at (3c) to which concentrated aqueous sodium carbonate solution (2d) has been added. The concentrated sodium carbonate solution desirably is concentrated to a nearly saturated solution, and is combined with the dilute sodium silicate solution in such proportions as to introduce from 0.015 to 15 moles of sodium carbonate per mole of the sodium silicate present. The carbon dioxide is supplied in a manner, and in a sufficient quantity, to effect complete precipitation of the silica present in the form of finely divided reinforcing silica pigment material, an excess of the carbon dioxide preferably being added after such precipitation as an alkalinity reducer as hereinafter described.

As shown in the drawing the concentrated essentially sodium carbonate solution (2d) is prepared by concentration in a concentrator (4c) of the relatively dilute sodium carbonate solution (4b) resulting from the precipitating reaction (3c). The concentrated essentially sodium carbonate aqueous solution (2d) may contain some minor quantity of sodium bicarbonate, resulting from the supply of excess carbon dioxide to precipitator (3c) or as alkalizing agent (5b).

The silica pigment material (4c) is separated as a wet cake from the relatively dilute essentially sodium carbonate solution (4b) by suitable separating means (4a) such as filter and/or centrifuge, or the like, and the said carbonate solution (4b) is recycled, preferably after being concentrated in a concentrator (4c) the heat for which may be supplied from the furnace (1c). Where economic and desirable, the water (4d) removed in the concentrator (4c) may be returned to the water supply (1f) used to prepare and dilute the aqueous sodium silicate (in 1g and 3a). Alternatively, the needed volume of solution (4b) may be recycled to the concentrated solution supply (2d) and may have its concentration there adjusted by addition of make-up sodium carbonate (2i).

The recycled concentrated sodium carbonate solution (from 4c) is only in part delivered to precipitator supply (2d). The balance of the concentrated essentially sodium carbonate solution (from 4c) is recycled to the silicate furnace (1c), after evaporation (and desirably decomposition of any sodium bicarbonate present) in an evaporation step (6b).

The separated silica pigment material (4c) may be removed as wet cake for further use with or without any further after treatment. When after-treatment (5a) is employed the silica pigment material (4c) may be reduced in alkalinity as by washing or soaking with any one of several alkalinity reducing agents (5b). Thus sodium bicarbonate solution (5b) or aqueous carbon dioxide (5b) may be employed for this purpose and thereafter be added to the sodium carbonate solution (4b). Aqueous solution of soluble mineral acid or organic acid (5b), may be employed as alkalinity reducing agent in lieu of or in addition to the sodium-bicarbonate or carbon dioxide after-treatment, and/or aqueous salts of the metals from groups II through VI, preferably groups II through IV, of the periodic table, may be so employed. Finally, the after-treated pigment may be water washed (5a), and/or be separated as a wet cake (5c). The alkalinity contained with the precipitate (4c) may be completely neutralized by prolonged soaking with the alkalinity reducing agents with or without agitation, but preferably is only partly neutralized therewith.

If desired the wet cake (4c or 5c) may be employed per se, as for example in master-batching with latices of natural or synthetic elastomers or plastomers or combinations of these, or the water may be removed to form dry silica pigment material as indicated (at 5d). Depending on which is the cheaper at any given time the sodium salt make-up may consist of sodium hydroxide, sodium bicarbonate, or sodium carbonate introduced at any appropriate place in the system as indicated in the drawing (at 1i and 2i), e.g. to the after-treatment (5a) as bicarbonate solution, or to the sodium carbonate supply (1i or 2i) as sodium carbonate.

When a plentiful source of cheap carbon dioxide is available it may replace in whole or in part the carbon dioxide from the silicate furnace. Similarly the minor proportions of carbon dioxide (6d) and water (6e) from the evaporator (6b) may be recovered or be replaced by make-up supplies when this is more economical. Under appropriate climatic conditions solar heat may be employed for one or more of the steps of concentration (4c), evaporation (6b) and drying (5d).

Thus, as shown in the drawing, the process essentially consists in converting coarse silica bearing material to fine silica pigment material in a recycle system, with or without after-treatment of the pigment, and with or without full recovery of evolved carbon dioxide and water. The invention may be practiced batchwise, stepwise, or continuously, depending on available equipment.

The novel features of the invention are set forth in the claims appended hereto, but the invention itself will be more precisely understood by reference to the following specific examples embodying the same, which are to be considered as illustrative and not restrictive of the invention

EXAMPLE 1

A (step 1). Silica flour and sodium carbonate were ground together in the ratio approximately of 830 grams to 470 grams and heated in an electric furnace in which carbon dioxide was evolved. The evolution of carbon dioxide which can be used in step 2, started at about 500°–700° C. and was completed as the temperature approached 1000°–1200° C. After 2 hours at about 1000°–1200° C. the fusion was complete. The molten sodium silicate, of composition $Na_2O(SiO_2)_{3.2}$, was run onto plates to partially cool and then dissolved in sufficient water to yield aqueous sodium silicate of a solids content of 37.6% by weight.

B (step 2). Thereafter 2790 grams of the aqueous solution of the above concentration containing 4 moles of sodium silicate of the composition expressed by $Na_2O(SiO_2)_{3.2}$ was diluted with 14 liters of water and placed in the precipitator vessel equipped with a low speed paddle stirrer. To this aqueous silicate of soda solution maintained at 25° C. while agitating was added over a period of about 5 hours 4 moles (424 grams) of sodium carbonate in 4 liters of water and concurrently over a period extending however to 8 hours was added 4.7 moles (207 grams) of carbon dioxide.

The rates of addition of the above materials is set out in Table I hereof.

Table I

| Time, Cumulative (minutes) | Sodium Carbonate Added, Cumulative (moles) | Acidulation (moles CO₂ cumulative) | $Na_2O(SiO_2)_x$ (value of x in system) | Acidulation Rate (moles H⁺ ion per minute) |
|---|---|---|---|---|
| 0 | | | 3.22 | |
| 70 | 1.02 | 0.62 | 3.84 | 0.018 |
| 130 | 1.50 | 0.85 | 4.08 | 0.008 |
| 190 | 2.00 | 0.95 | 4.24 | 0.003 |
| 250 | 2.38 | 1.02 | 4.30 | 0.002 |
| 295 | 4.00 | 1.10 | 4.47 | 0.004 |
| 370 | | 1.20 | 4.60 | 0.003 |
| 430 | | 1.31 | 4.81 | 0.004 |
| 490 | | 2.00 | 6.45 | 0.013 |
| 500 | | 2.65 | 8.50 | 0.13 |
| 510 | | 4.00 | | 0.27 |

Precipitation of the silica pigment began when about 1.4 moles of the carbon dioxide (per 4 moles of the sodium silicate) had been added and was apparently complete before the entire 4 moles had been added.

The silica precipitate was filtered and washed with 1 liter of water yielding 10 liters of filtrate and 2600 g. of filter cake which contained about 60% to 70% water.

C (step 3). Sufficient of the sodium carbonate in the 10 liters of filtrate from step 4 is concentrated for recycle to step 2. Accordingly 7 liters of the solution by evaporation is concentrated to 5 liters and is available for recycle to step 2. The remaining 3 liters of filtrate from step 2 is evaporated to dryness, and sufficient make-up (soda ash) is added to compensate for handling losses, and is returned to the supply of sodium carbonate for recycle to step 1. Alternatively the 3 liters to be evaporated to dryness can be concentrated with the 7 liters (as at 4c in the drawing), and if desired the functions of the concentrator (4c) and evaporator (6b) may be combined in a single unit. As another alternative, which eliminates the need for concentrator (4c), about five liters of the filtrate (4b) may be delivered to the sodium carbonate supply (2d) and be augmented there with sodium carbonate the quantities being appropriate to restore the concentration of $Na_2CO_3$ to at least 4.0 moles in the five liters of solution. The filter cake was divided into portions. First portion of this filter cake was further water washed, dried in an oven at 105° C., ground, and screened through a 150 mesh screen and this product was designated as "silica 1-A."

A second portion of said filter cake was further water washed and acidified with 2 N hydrochloric acid until acid to methyl orange then sufficient sodium carbonate was added to make the precipitate just alkaline to methyl orange then the precipitate was filtered, washed and dried in an oven at 105° C., ground and screened through a 150 mesh screen and this product was designated as "silica 1-B."

A third portion of the filter cake was treated in the same manner as "silica 1-B" heretofore, except that said precipitate was slurried in water and boiled for ½ hour and then was made acid to methyl orange and then sufficient sodium carbonate was added to make said precipitate just alkaline to methyl orange. The filtered, washed, dried and ground product was designated as "silica 1-C."

The silica pigment materials designated as silicas 1-A, 1-B and 1-C were each compounded with a butadiene-styrene type elastomer (SBR-1500) according to the compounding recipe set forth in Table II hereof.

*Table II*

| Compound ingredients: | Quantities (grams) |
|---|---|
| Butadiene-styrene copolymer [1] | 100.0 |
| Silica pigment material | 58.5 |
| Antioxidant—2,2 - methylene - bis(4 - methyl-6-t.-butylphenol) [2] | 2.0 |
| Triethanolamine | 1.0 |
| Paracoumarone-indene resine [3] | 10.00 |
| Stearic acid | 3.0 |
| Zinc oxide | 5.0 |
| Di-2-benzothiazyl disulphide [4] | 1.25 |
| N,N'-di-o-tolylguanidine [5] | 1.75 |
| Sulfur | 3.0 |

[1] SBR-1500.
[2] Antioxidant 2246, a trademark product of American Cyanamid Co.
[3] Cumar Resin RH, a trademark product of Allied Chemical Corp.
[4] Altax, a trademark product of R. T. Vanderbilt Co., Inc.
[5] DOTG, a trademark product of American Cyanamid Co.

In compounding the stock the selected silica pigment material was milled into the SBR-1500 together with the antioxidant and the stock aged overnight and then milled with the remaining compounding ingredients and cured for 45 minutes at 287° F.

The physical test data for the respective vulcanizates containing the foregoing silica pigment examples is set forth in Table III hereof.

*Table III*

| Silica Tested (In vulcanizate) | Tensile (p.s.i.) | Elongation (percent) | Modulus (300%) | Hardness (Shore A) |
|---|---|---|---|---|
| 1-A | 925 | 450 | 512 | 67 |
| 1-B | 2,870 | 575 | 1,000 | 70 |
| 1-C | 3,320 | 575 | 1,225 | 60 |

EXAMPLE 2

This example was carried out in a manner similar to Example 1. The sodium silicate being prepared by the fusion of silica and sodium carbonate. The sodium silicate glass was dissolved in water to make a 41° Bé. aqueous solution containing sodium silicate of the composition represented by $Na_2O(SiO_2)_{3.2}$ and 2000 ml. of this solution was diluted with 14 liters of water and placed in a precipitator vessel equipped with an agitator and the temperature thereof raised to 78° C. To this hot aqueous sodium silicate solution was gradually added 4 liters of an aqueous solution containing 4 moles of sodium carbonate and concurrently therewith but over a more extended period was added 4 moles of carbon dioxide.

The rates of addition of these materials are set out in Table IV hereof.

*Table IV*

| Time, Cumulative (minutes) | Sodium Carbonate Added, Cumulative (moles) | Acidification (moles $CO_2$ cumulative) | $Na_2O(SiO_2)_x$ (value of x in system) | Acidulation Rate (moles $H^+$ ion per minute) |
|---|---|---|---|---|
| 0 | | | 3.22 | |
| 55 | 0.04 | 0.70 | 3.87 | 0.025 |
| 70 | 0.24 | 0.72 | 3.93 | 0.003 |
| 85 | 0.36 | 0.76 | 3.98 | 0.005 |
| 100 | 0.46 | 0.78 | 4.00 | 0.003 |
| 130 | 0.58 | 0.80 | 4.02 | 0.001 |
| 160 | 0.82 | 0.83 | 4.08 | 0.001 |
| 190 | 1.04 | 0.94 | 4.24 | 0.007 |
| 220 | 1.05 | 1.24 | 4.67 | 0.020 |
| 235 | 1.44 | 1.48 | 5.03 | 0.025 |
| 250 | 2.56 | 1.80 | 5.86 | 0.049 |
| 265 | 4.00 | 2.88 | 11.50 | 0.144 |
| 270 | | 3.68 | 41.00 | 0.320 |
| 275 | | 4.23 | | |

The precipitated silica was filtered and the filtrate recycled to the process as in example 1 hereof. The wet silica filter cake was divided into portions and treated in a manner exactly similar to silica samples 1-A, 1-B and 1-C respectively and designated as 2-A, 2-B and 2-C respectively. These silica samples were compounded using the compounding recipe set forth in table II hereof and the stocks cured for 45 minutes at 287° F.

The physical test data for the respective vulcanizates containing the foregoing silica pigment examples is set forth in Table V hereof.

*Table V*

| Silica Tested (In vulcanizate) | Tensile (p.s.i.) | Elongation (percent) | Modulus (300%) | Hardness (Shore A) |
|---|---|---|---|---|
| 2-A | 1,485 | 450 | 758 | 71 |
| 2-B | 3,180 | 550 | 1,080 | 68 |
| 2-C | 3,460 | 575 | 990 | 66 |

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

We claim:

1. A cyclical process for forming silica pigment which comprises:

(a) delivering 1 to 4 moles of silica in the form of silica sand and 1 mole of sodium carbonate to a fusion reactor and heating to fuse the same and form carbon dioxide and sodium silicate of the formula $Na_2O(SiO_2)_x$ wherein $x$ has a value between 1 and 4, (b) dissolving the sodium silicate formed in step (a) in sufficient water to form an aqueous solution essentially comprising 5% to 20% sodium silicate by weight, (c) combining with the aqueous sodium silicate solution from step (b) a quantity of nearly saturated sodium carbonate solution in the proportions of about 0.015 to 15 moles of sodium carbonate per mole of sodium silicate and treating the same with carbon dioxide to form therein silica pigment and a diluted aqueous solution containing a further quantity of sodium carbonate, (d) separating the silica pigment from the diluted aqueous solution formed in step (c), (e) concentrating a sufficient part of the solution separated in step (d) to re-form the quantity of nearly saturated sodium carbonate solution employed in step (c), and (f) recycling said quantity of nearly saturated sodium carbonate solution to step (c).

2. A cyclical process for forming silica pigment according to claim 1; further comprising the step of (g) employing carbon dioxide produced by step (a) as the carbon dioxide with which the solution of sodium silicate is treated in step (c).

3. A cyclical process for forming silica pigment according to claim 1 further comprising the steps of (g) recovering sodium carbonate from that part of the solution separated in step (d) which is not recycled in step (f) and (h) recycling the so recovered sodium carbonate to step (a).

4. A cyclical process for forming silica pigment according to claim 3; further comprising the step of (i) employing carbon dioxide produced by step (a) as the carbon dioxide with which the solution of sodium silicate is treated in step (c).

5. A cyclical process for forming silica pigment which comprises:

(a) delivering 1 to 4 moles of silica in the form of silica sand and 1 mole of sodium carbonate to a fusion reactor and heating to fuse the same and form carbon dioxide and sodium silicate of the formula $Na_2O(SiO_2)_x$ wherein $x$ has a value between 1 and 4, (b) dissolving the sodium silicate formed in step (a) in sufficient water to form an aqueous solution essentially comprising 5% to 20% sodium silicate by weight, (c) combining with the aqueous sodium silicate solution from step (b) a quantity of nearly saturated sodium carbonate solution in the proportions of about 0.015 to 15 moles of sodium carbonate per mole of sodium silicate and treating the same with carbon dioxide to form therein silica pigment and a diluted aqueous solution containing a further quantity of sodium carbonate, (d) separating the silica pigment from the diluted aqueous solution formed in step (c), (e) recovering sodium carbonate from a part of the solution separated in step (d), and (f) recycling the so recovered sodium carbonate to step (a).

6. A cyclical process for forming silica pigment according to claim 5; further comprising the step of (g) employing carbon dioxide produced by step (a) as the carbon dioxide with which the solution of sodium silicate is treated in step (c).

References Cited in the file of this patent

UNITED STATES PATENTS

| | | |
|---|---|---|
| 2,010,655 | Wollner | Aug. 6, 1935 |
| 2,940,830 | Thornhill | June 14, 1960 |

FOREIGN PATENTS

| | | |
|---|---|---|
| 299,483 | Great Britain | Oct. 29, 1928 |
| 845,565 | Great Britain | Aug. 24, 1960 |

OTHER REFERENCES

Jacobson: Encylopedia of Chemical Reactions, vol. 6, Reinhold Publishing Corp. New York, 1956, page 332, reaction VI–1473.